United States Patent

Heinemann et al.

[11] 4,320,926
[45] Mar. 23, 1982

[54] HYDROSTATIC BEARING APPARATUS

[75] Inventors: Otto Heinemann, Ennigerloh; Helmut Lücke, Beckum; Werner Schossler, Ahlen; Burkhard Heiringhoff, Oelde; Helmut Krumme, Wadersloh, all of Fed. Rep. of Germany

[73] Assignee: Krupp Polysius AG, Fed. Rep. of Germany

[21] Appl. No.: 167,804

[22] Filed: Jul. 14, 1980

[30] Foreign Application Priority Data

Aug. 2, 1979 [DE] Fed. Rep. of Germany ....... 2931364

[51] Int. Cl.³ .............................................. F16C 32/06
[52] U.S. Cl. ...................................... 308/9; 308/160; 308/170; 308/5 R
[58] Field of Search ..................... 308/9, DIG. 1, 170, 308/160, 5 R, 122, 73

[56] References Cited

U.S. PATENT DOCUMENTS

| 3,451,731 | 6/1969 | Weichsel | 308/170 |
| 4,035,041 | 7/1977 | Larsson | 308/160 |
| 4,099,802 | 7/1978 | Heinemann et al. | 308/9 |
| 4,106,824 | 8/1978 | Meystre et al. | 308/9 |

Primary Examiner—Lenard A. Footland
Attorney, Agent, or Firm—Learman & McCulloch

[57] ABSTRACT

A hydrostatic bearing the bearing surface of which contains several pressure pockets. A bore arranged symmetrically to the pressure pockets connects the latter with a pressure relief chamber and with a source of hydraulic pressure medium. A bearing such as this is characterized by its simple construction and by reliable hydraulic pressure relief for each bearing shoe.

12 Claims, 5 Drawing Figures

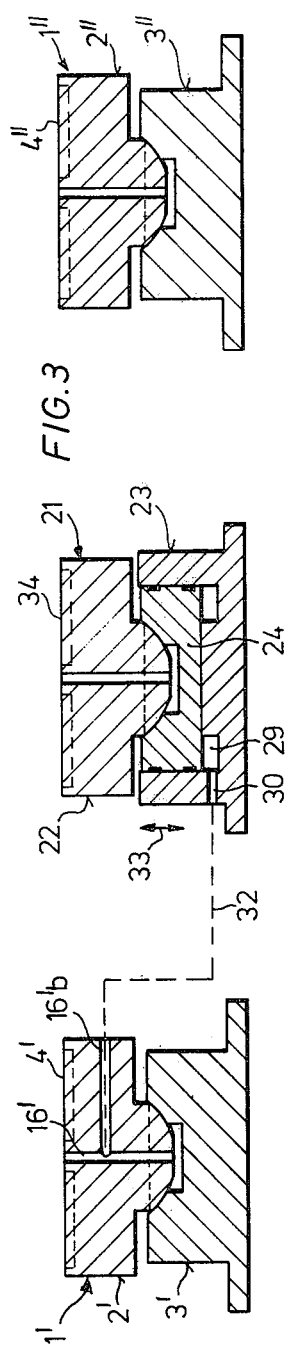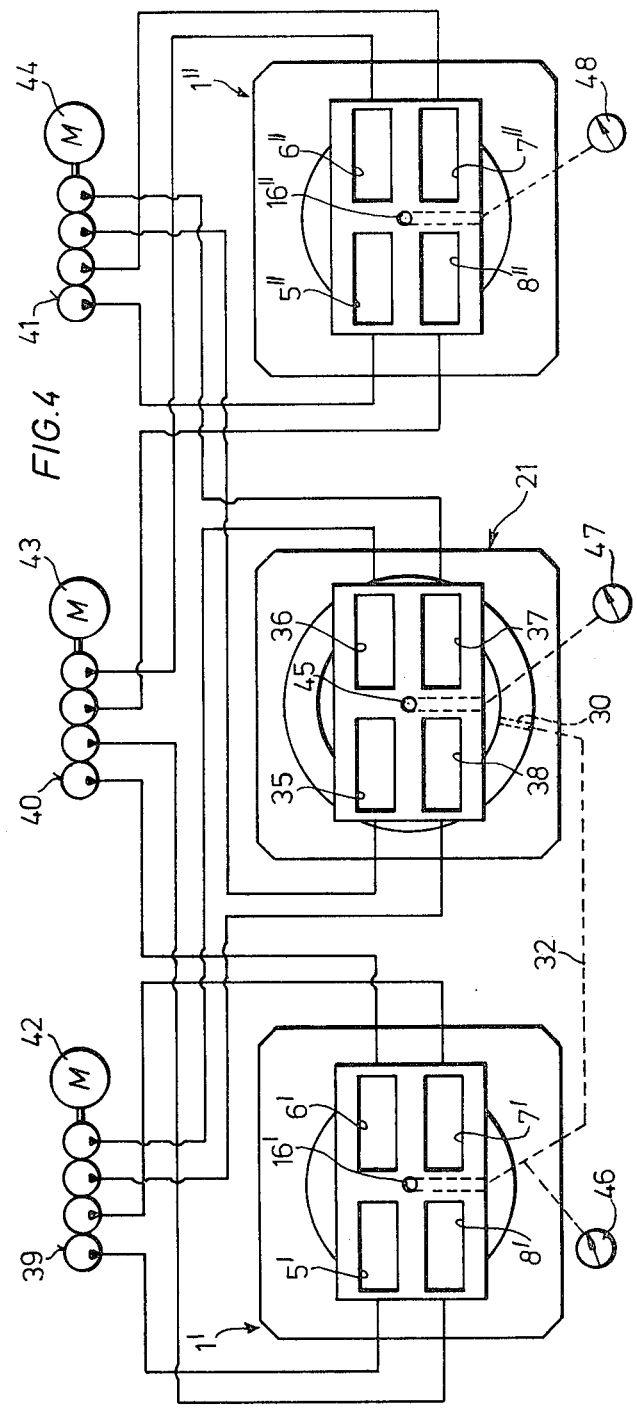
FIG.3
FIG.4

HYDROSTATIC BEARING APPARATUS

BACKGROUND OF THE INVENTION

This invention relates to a hydrostatic bearing comprising at least one bearing shoe comprising a lower part and an upper part which is tiltably and rotatably supported thereon and which is fed with a hydraulic pressure medium in the vicinity of its upper side forming the bearing surface, being provided with a connecting bore which connects the upper side to the lower side and which is designed to relieve the mechanical support of hydraulic pressure.

In one known hydrostatic bearing construction (cf. DE-AS No. 20 49 402), the lower end of the upper part of the bearing shoe with its hemispherical outer periphery projects into a cylindrical recess in the lower part of the bearing shoe and, at the same time, is supported by a centrally arranged ball which is in engagement with hemispherical recesses in the upper part of the bearing shoe on the one hand and in the lower part of the bearing shoe on the other hand. In addition, this ball is supported by the upwardly directed end of a piston rod of an adjusting piston mounted for displacement in the lower end of the lower part of the bearing shoe. The connecting bore which, in this case, is present between the upper side (bearing surface) and the lower side of the upper part of the bearing shoe opens in the vicinity of the outer edge of the bearing surface and, in addition, mainly establishes the connection between the bearing surface and the pressure medium supply line. One major disadvantage of this known construction lies in the particularly high structural outlay involved in obtaining the movable, mechanical support with hydraulic pressure release.

Accordingly, the object of the present invention is to provide a hydrostatic bearing of the type referred to at the beginning which is distinguished by its particularly simple construction and by its reliable hydraulic pressure relief for each bearing shoe.

SUMMARY OF THE INVENTION

According to the invention, this object is achieved in that the bearing surface contains several pressure pockets and the upper opening of the connecting bore is arranged symmetrically to these pressure pockets, preferably at the center of the bearing surface.

By virtue of the symmetrical arrangement of the upper opening of the connecting bore to the pressure pockets of the bearing surface, this opening is situated at a point at which an averaged pressure of the hydraulic pressure medium is present so that this averaged pressure may be optimally used as a control pressure for the hydraulic pressure relief of the mechanical support. This arrangement of the connecting bore is preferably situated at the center of the bearing surface where the narrowest pressure medium gap between the bearing surface and the rotary element to be supported is also situated. At this point of the bearing surface, no misinterpretation of the necessary control pressure will occur, even in the event of pressure fluctuations in the individual pressure pockets (attributable to the deformations encountered). By virtue of this arrangement, it is also possible to make at least the upper part of each bearing shoe lighter in construction by comparison with known arrangements, because there is no longer any need for a dimensionally stable upper part of the bearing shoe so far as the control of the hydraulic pressure relief is concerned.

With the bearing construction according to the invention, it has also been found that, by virtue of the previously explained removal of the averaged pressure medium pressure at the narrowest point where the highest pressure always prevails, it is possible to obtain particularly high damping of the bearing system as a whole.

According to the invention, the connecting bore best opens into a relief chamber which is machined into the upper side of the lower part of the bearing shoe and which is covered by the lower side of the upper part of the bearing shoe.

In one particularly favorable embodiment of the invention, the relief chamber is surrounded by a hemispherical annular supporting surface with which a similarly hemispherical counter supporting surface matchingly formed on the underneath of the upper part of the bearing shoe is in engagement, the annular supporting surface of the lower part of the bearing shoe and the counter supporting surface of the upper part of the bearing shoe forming the mechanical support of the bearing shoe. A bearing shoe constructed in this way provides for extremely inexpensive manufacture and offers a sufficiently large spherical supporting surface so that, when the rotary element to be supported is stationary, the supporting surface is subjected to an acceptable load per unit area, even in the absence of special hydraulic relief. In operation, the friction in the spherical supporting surface is reduced to an acceptable minimum by the hydraulic relief of pressure.

With the bearing construction according to the invention, it is generally preferred for the annular supporting surface to be machined in concave form into the upper side of the lower part of the bearing shoe, while the annular counter supporting surface is produced in convex form on the underneath of a central part of the upper part of the bearing shoe which projects downwards in the shape of a journal.

The construction described above may of course also be inverted, i.e., the annular supporting surface of the lower part of the bearing shoe may be convex and the counter supporting surface of the upper part of the bearing shoe may be concave.

Where at least three bearing shoes are used in the hydrostatic bearing, it is regarded as particularly favorable in accordance with the invention for two bearing shoes to have a substantially integral, fixed lower part while the third bearing shoe and, if present, any further bearing shoe is provided in its lower part with a radially adjustable (relative to the rotary element to be supported) hydraulic piston which is guided in this lower part and which carries the relief chamber and the annular supporting surface for the mechanical support on its upper side while its lower side is connected through a hydraulic pressure chamber present in the lower part and through a pressure line to the connecting bore of one of the two bearing shoes with a fixed lower part. In this way, the hydraulic piston of the third bearing shoe (and any further bearing shoe) may be controlled in the sense of a uniform load distribution through the bearing shoe comprising the fixed lower part.

Particularly reliable control of the hydraulic pressure relief for the mechanical support is obtained where the bearing surface comprises four pressure pockets which are separated from one another by webs, which are arranged symmetrically to one another and to the center of the bearing surface and of which two pressure pockets diagonally opposite one another relative to the center are connected to a group of pumps driven together or to a common multiple pump.

DESCRIPTION OF THE DRAWINGS

Preferred embodiments of the invention are described in the following with reference to the accompanying, largely diagrammatic drawings, wherein:

FIG. 3 shows the association of three bearing shoes of a hydrostatic bearing (the bearing shoes being shown in vertical section).

FIG. 4 is a plan view of the three bearing shoes shown in FIG. 3, including the purely schematized hydraulic line system.

DETAILED DESCRIPTION

One embodiment of a bearing shoe which may be used in a hydrostatic bearing according to the invention will first be described with reference to FIGS. 1 and 2.

Figure 1:
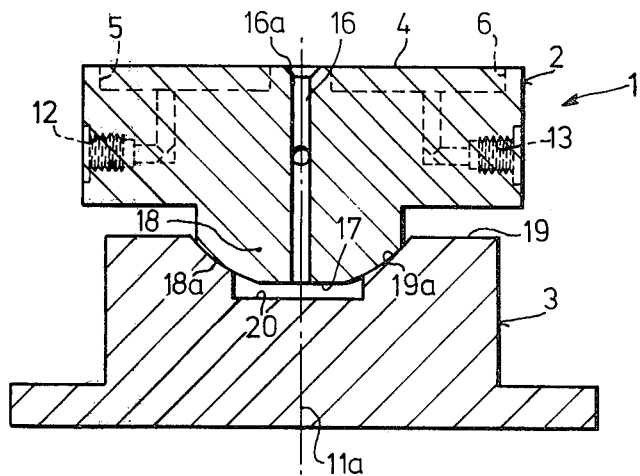
FIG. 1 is a vertical section through a bearing shoe comprising a one-piece lower part.
Figure 2:
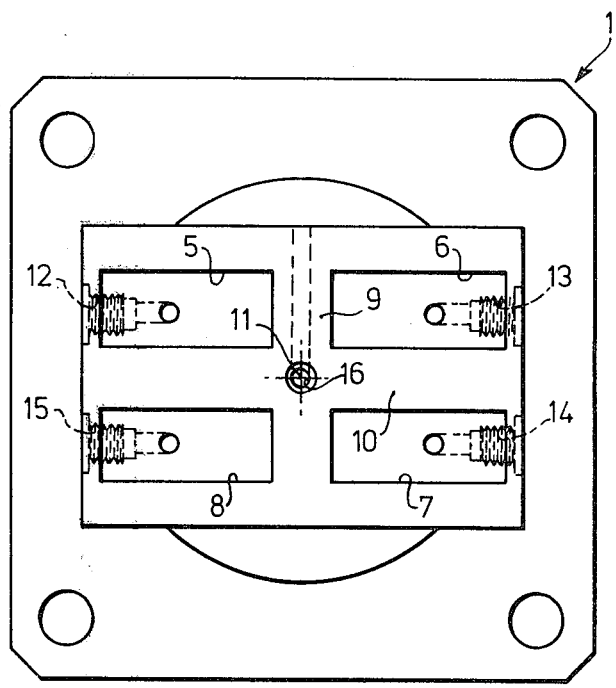
FIG. 2 is a plan view of the bearing shoe shown in FIG. 1.

The bearing shoe 1 shown in FIGS. 1 and 2 comprises an upper part 2 which is tiltably and rotatably supported on a lower part 3.

The upper surface of the upper part 2 forms a bearing surface 4 which is divided up into several pressure pockets 5, 6, 7, 8 (also known as oil pockets). As shown in FIG. 2, there are preferably four pressure pockets 5 to 8 which are separated from one another by webs 9, 10 and which are arranged symmetrically to one another and to the center of the bearing surface.

Each pressure pocket 5 to 8 is supplied with hydraulic pressure medium, preferably oil, through separate connections 12, 13, 14 and 15, as will be explained hereinafter.

A connecting bore 16 is provided in the upper part 2, connecting its upper side, i.e. the bearing surface 4, to its lower side 17. This connecting bore is preferably arranged centrally in the upper part 2 (cf. in particular FIG. 2), its geometric axis being situated on the vertical central axis 11a of the bearing shoe which passes through the center 11 of the bearing surface 4. In this way, the upper opening 16a of the connecting bore 16 is also situated symmetrically to the four pressure pockets 5 to 8, i.e., lies at the point of intersection of the two webs 9 and 10 spearating the pressure pockets 5 to 8 from one another (cf. FIG. 2).

FIG. 1 shows that the upper part 2 and the lower part 3 of the bearing shoe 1 are in hemispherical engagement with one another. To this end, the upper part 2 comprises a central part 18 which projects downwards like a journal and of which the underneath 18a is convex in shape towards the lower part 3 of the bearing shoe, forming a hemispherical, annular (counter) supporting surface. By contrast, a similarly hemispherical annular supporting surface 19a matching the underneath 18a of the upper part 2 is machined into the upper side 19 of the upper part 2 is machined into the upper side 19 of the lower part 3 of the bearing shoe and thus forms a concave recess. This annular supporting surface 19a together with the counter supporting surface 18a essentially forms the mechanical support of the upper part 2 on the lower part 3 of the bearing shoe 1.

In addition, a central relief chamber 20 (for example in the form of a circular recess) is centrally machined into the upper side 19 of the lower part 3 of the bearing shoe, being surrounded by the annular supporting surface 19a of this lower part 3 and being covered over its upper side by the lower side 17 of the upper part 2, i.e., in this case by the lower side 17 of the journal-like part 18. The lower end of the connecting bore 16 opens into this relief chamber 20.

In operation, i.e., when a machine part (not shown) is rotatingly supported by the bearing surface 4 of the upper part 2, the pressure pockets 5 to 8 receive through their connections 12 to 15 an amount of oil sufficient to ensure that, depending on the load, a more or less wide oil gap is formed and can be maintained between the machine part to be supported and the bearing surface 4. To ensure that the upper part 2 of the bearing shoe is able to follow any shifting movements of the machine part to be supported (which is particularly important in the case of large-diameter machine parts, such as rotary drums), it is tiltably and rotatably supported on the lower part 3 of the bearing shoe in the manner illustrated. The mechanical support is then hydraulically relieved of pressure through the relief chamber 20 by means of the connecting bore 16, so that minimal friction occurs between the hemispherical annular supporting surface 18a of the upper part 2 and the similarly hemispherical annular counter supporting surface 19a of the lower part 3, the hydraulic pressure relief being controlled extremely favorably by the averaged oil pressure of the bearing surface 4. In addition, it has proved to be particularly favorable in this respect for two of the four pressure pockets 5 to 8 which are situated diagonally opposite one another relative to the center 11 of the bearing surface (i.e., 5 and 7 or 6 and 8) to be connected to a group of pumps driven together or to a common multiple pump.

In connection with FIGS. 1 and 2, it is further pointed out that, as shown in FIG. 1 in particular, the lower part 3 of the bearing shoe 1 is largely in one piece and fixedly mounted (screwed) to a support (not shown).

While it is generally possible to provide the hydrostatic bearing with one or two of the bearing shoes illustrated in FIGS. 1 and 2, it is preferred in the case of larger rotating elements or machine parts to be supported to provide at least three bearing shoes in the hydrostatic bearing. One such embodiment is described in detail with reference to FIGS. 3, 4 and 5, FIGS. 3 and 4 showing the purely schematic association of three bearing shoes.

In an association of three bearing shoes such as this, two bearing shoes 1', 1" have a substantially one-piece, fixed lower part 3', 3" on which an upper part 2', 2" is supported. These two bearing shoes 1' and 1" with their fixed lower parts 3', 3" have the same construction as the bearing shoe 1 shown in FIGS. 1 and 2, so that there is no need for further explanation.

The third bearing shoe 21 used in FIGS. 3 and 4 which, as shown in FIGS. 3 and 4, may be arranged symmetrically between the two previously mentioned bearing shoes 1' and 1", has an upper part 2 which may have exactly the same construction as the upper part 2' and 2" of the bearing shoes 1' and 1". By contrast, the lower part 23 of this bearing shoe 21 is slightly modified in that it comprises a hydraulic piston 24 mounted for radial adjustment in this lower part in relation to the bearing element to be supported (not shown).

Figure 5:
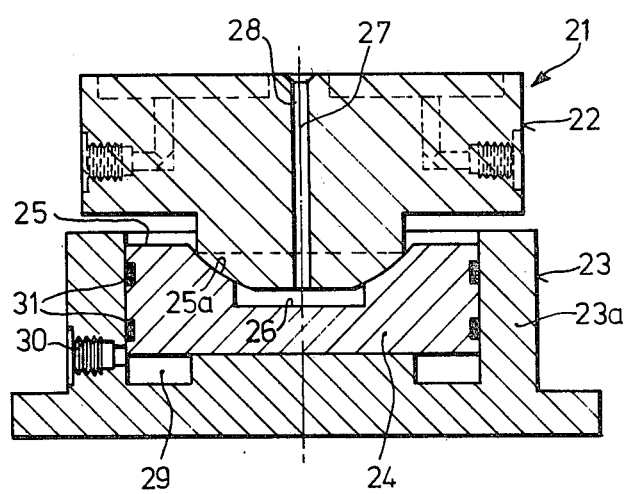
FIG. 5 is a vertical section through a bearing shoe which, in addition to the bearing shoes shown in FIGS. 1 and 2, is used in the association shown in FIGS. 3 and 4 and which comprises a hydraulic piston in its lower part.

As can be seen in particular from the detailed illustration of this bearing shoe 21 in FIG. 5, the pressure relief chamber 26 and the annular supporting surface for the mechanical support already known from the embodiment shown in FIGS. 1 and 2 are in this case machined into the upper side 25 of the hydraulic piston in exactly the same way and form as the annular supporting surface 19a and the relief chamber 20 of the lower part 3 shown in FIGS. 1 and 2. Since, as already mentioned, the upper part 22 of the bearing shoe corresponds in its shape and configuration to the upper part shown in FIGS. 1 and 2, there is no need for its construction to be discussed. Reference is merely made once again to the connecting bore 28 arranged symmetrically to the vertical central axis 27.

A hydraulic pressure chamber 29 is present in the lower part 23 on the lower side of the hydraulic piston 24, preferably assuming the form of an outer annular chamber (cf. FIG. 5) and comprising a pressure connection 30. The outer periphery of the piston 24 is sealed off by known ring seals 31 from the fixed cylindrical peripheral wall 23a of the lower part 23.

As shown in FIGS. 3 and 4, this third bearing shoe 21 is connected to one of the two bearing shoes comprising a fixed lower part, in this case to the bearing shoe 1'. This connection is established by connecting the lower side of the hydraulic piston 24 through the hydraulic pressure chamber 29, its pressure connection 30 and a pressure line 32 (shown only in chain lines) to the connecting bore 16' of the bearing shoe 1', the pressure line 32 being connected to a branch 16'b of the connecting bore 16'. In this way, the pressure prevailing in the connecting bore 16' of the bearing shoe 1' (i.e., the averaged oil pressure of the bearing surface 4') may be used to control the hydraulic piston 24 of the third bearing shoe 21, so that the upper part 22 of the bearing shoe with its bearing surface 34 may be applied radially to the rotating part (not shown in detail) by correspondingly moving the piston 24 in the direction of the double arrow 33 which in turn leads to an extremely uniform distribution of load between the bearing shoes of the entire hydrostatic bearing.

As explained earlier, two of the four pressure pockets of each bearing shoe which are arranged diagonally opposite one another relative to the center of the bearing surface are best connected to a group of pumps driven together or to a common multiple pump. This supply of pressure medium to the pressure pockets for the three bearing shoes 1', 1" and 21 of the hydrostatic bearing shown in FIGS. 3 and 4 is diagrammatically illustrated in FIG. 4. In this case, three multiple pumps 39, 40, 41 are provided, being in the form of quadruple pumps and each being driven by a separate drive motor 42, 43, 44.

Referring for example to the multiple pump 39 arranged in the vicinity of the bearing shoe 1', two pump compartments supply the two diagonally opposite pressure pockets 5' and 7' of the bearing shoe 1' with oil, while the other two pump compartments supply the diagonally opposite pressure pockets 36 and 38 of the bearing shoe 21 with oil. By contrast, through two of its pump compartments, the multiple pump 40 arranged in the vicinity of the middle bearing shoe 21 supplies the other two diagonally opposite pressure pockets 6', 8' of the bearing shoe 1' and the two diagonally opposite pressure pockets 6" and 8" of the bearing shoe 1". The other pressure pockets 35 and 37 of the bearing shoe 21 and the pressure pockets 5" and 7" of the bearing shoe 1" are then supplied with oil by the corresponding pump compartments of the third multiple pump 41. If in this case a motor, for example the motor 42, should fail, the supply of oil from the associated multiple pump, i.e., the multiple pump 39, is interrupted, so that in the case of the bearing shoe 1' the pressure pockets 5' and 7' drop out, while in the case of the bearing shoe 21 the pressure pockets 36 and 38 drop out. Since the other diagonally opposite pressure pockets of the two bearing shoes 1', 21 continue to be supplied with oil through a separate hydraulic circuit, a minimum lubricating function can be maintained.

As can further be seen from FIG. 4, a pressure monitor 46, 47, 48 may be associated with each connecting bore 16', 16", 45 of the bearing shoe 1', 1" and 21, being connected control-wise to the oil supply of the associated bearing shoes 1', 1" and 21.

Generally, it is pointed out that the bearing surfaces of the bearing shoes may of course be adapted to the peripheral form of the rotating element to be supported. The bearing shoes of a hydrostatic bearing are not of course arranged in one plane (as shown in FIG. 3 in the interests of simplicity), but instead are arranged at intervals on an arc which is adapted to the peripheral form of the rotating element to be supported. In contrast to the illustrated embodiments, it is of course possible to select any other suitable number of pressure pockets in the bearing surface with a corresponding arrangement of the connecting bore.

The disclosure is representative of the preferred embodiment of the invention and is intended to be illustrative rather than definitive thereof. The invention is defined in the claims.

We claim:

1. Hydrostatic bearing apparatus comprising at least one bearing shoe having a lower part and an upper part tiltably and rotatably supported on said lower part, said upper part having a bearing surface, said upper part having a bore communicating between said bearing surface and a pressure relief chamber between said upper and lower parts; and means for delivering a hydraulic pressure medium through said bore to said bearing surface, said bearing surface having a plurality of pressure pockets therein and arranged symmetrically relative to said bore.

2. Apparatus according to claim 1 wherein said bore is at the center of said bearing surface.

3. Apparatus according to claim 1 wherein there are four of said pressure pockets separated from one another by webs.

4. Apparatus according to claim 3 wherein a first pair of said pressure pockets are diagonally opposite one another and a second pair of said pressure pockets are diagonally opposite each other, and wherein the means for delivering said hydraulic pressure medium comprises one pump means connected to said first pair of pockets and second pump means connected to said second pair of pockets.

5. Apparatus according to claim 4 wherein said first and second pump means include separate drive means.

6. Apparatus according to claim 1 wherein said relief chamber is surrounded by a hemispherical supporting surface in said lower part and a hemispherical counter supporting surface in said upper part.

7. Apparatus according to claim 6 wherein said supporting surface is concave and said counter supporting surface is convex.

8. Apparatus according to claim 1 including at least three of said bearing shoes two of which have fixed lower parts and the remainder of which has its lower part joined to a piston reciprocable in a cylinder.

9. Apparatus according to claim 8 wherein the pressure relief chamber in the remainder of said bearing shoes is formed between said piston and the associated upper part.

10. Apparatus according to claim 8 including a pressure chamber between said piston and said cylinder, and means establishing communication between said pressure chamber and the bore of one of the bearing shoes having a fixed lower part.

11. Apparatus according to claim 1 wherein there are four of said pressure pockets separated from one another by intersecting webs, and wherein said bore communicates with said bearing surface at the intersection of said webs.

12. Apparatus according to claim 11 wherein the geometric axis of said bore coincides with the vertical central axis of said bearing shoe.

* * * * *